Jan. 14, 1964   J. MROWINSKI   3,117,680
DEVICE FOR HANDLING PIECES HAVING A SQUARE OR LIKE CROSS-SECTION
Filed Aug. 8, 1960   6 Sheets-Sheet 1
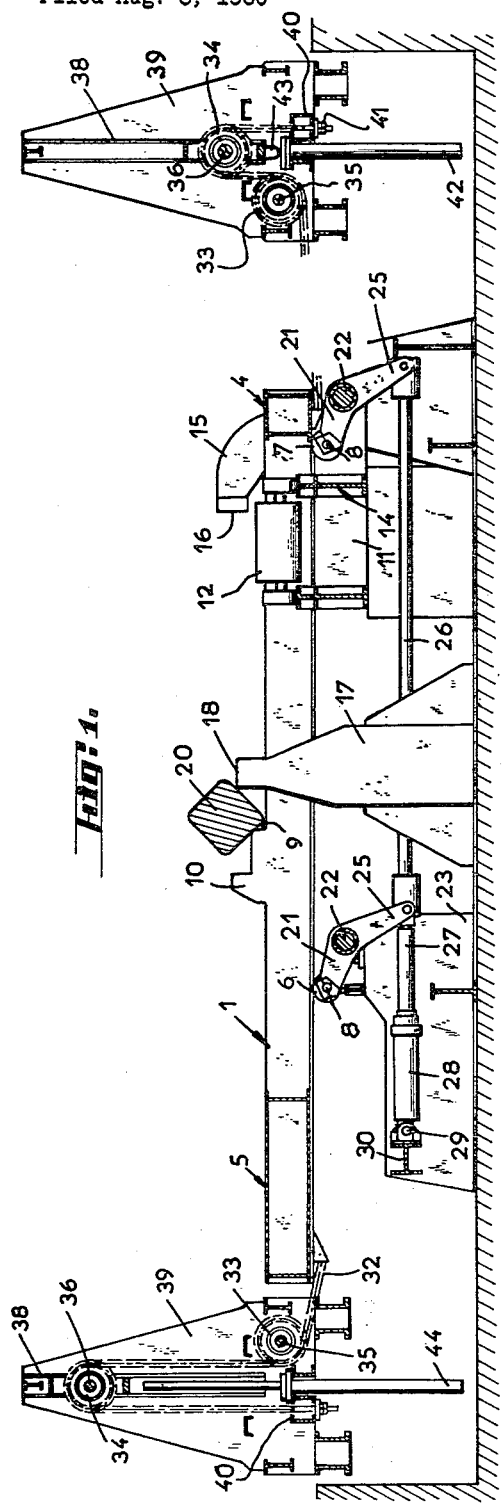
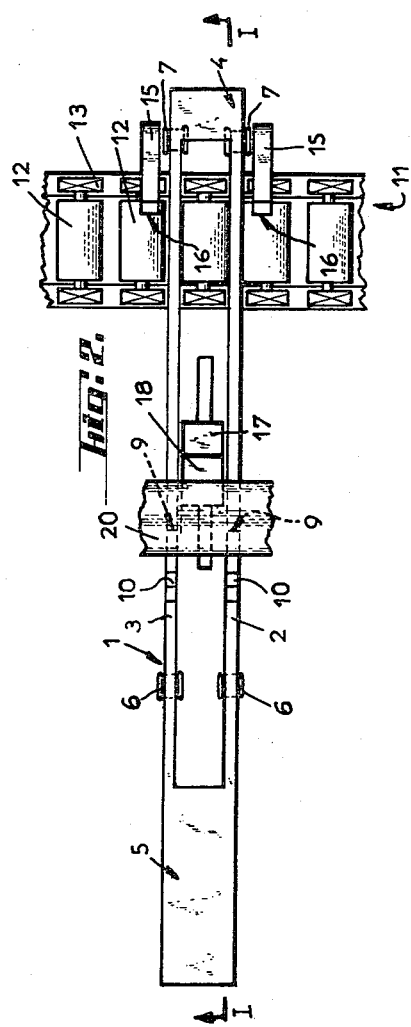
Inventor:
Jerome Mrowinski
By Nolte & Nolte
Attorneys Jan. 14, 1964   J. MROWINSKI   3,117,680
DEVICE FOR HANDLING PIECES HAVING A SQUARE OR LIKE CROSS-SECTION
Filed Aug. 8, 1960   6 Sheets-Sheet 2
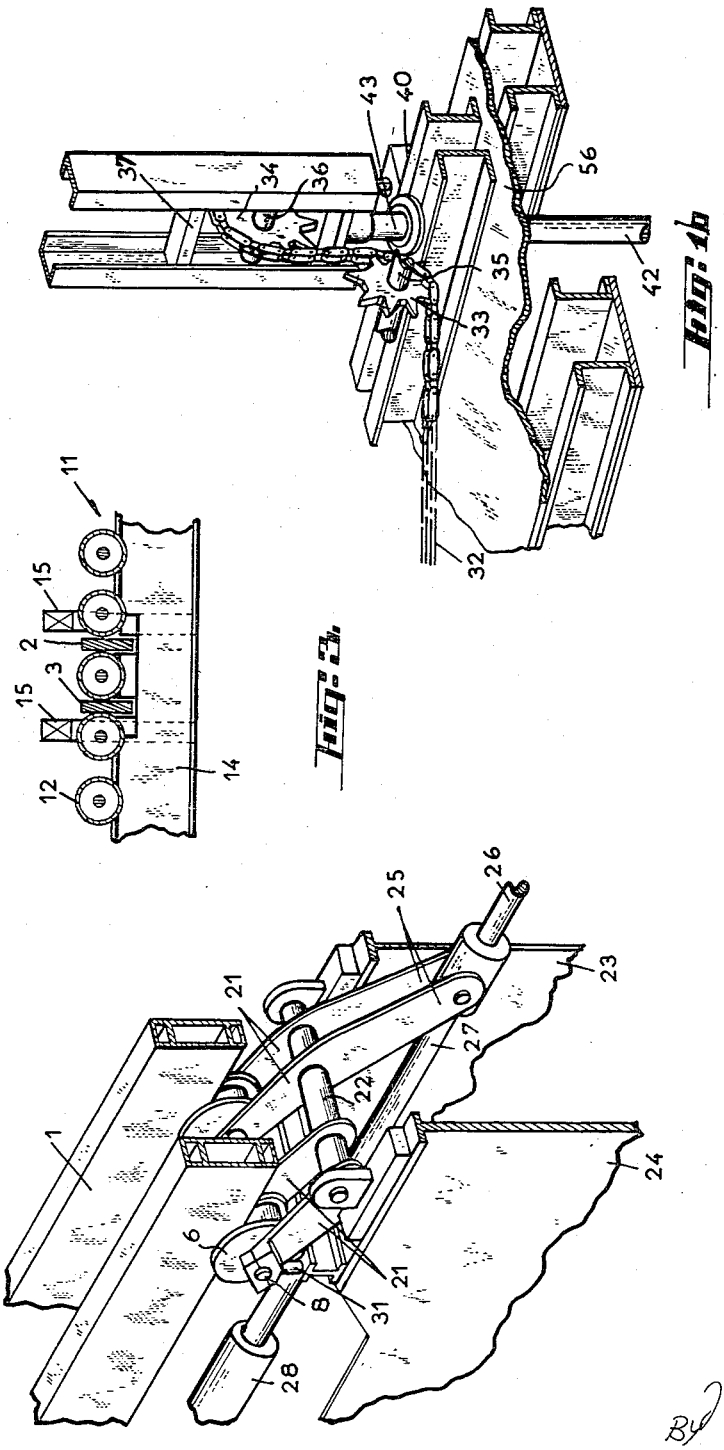
Inventor:
Jerome Mrowinski
By Nolte & Nolte
Attorneys

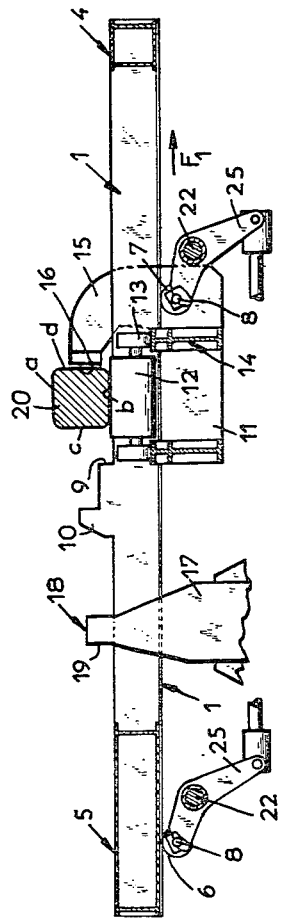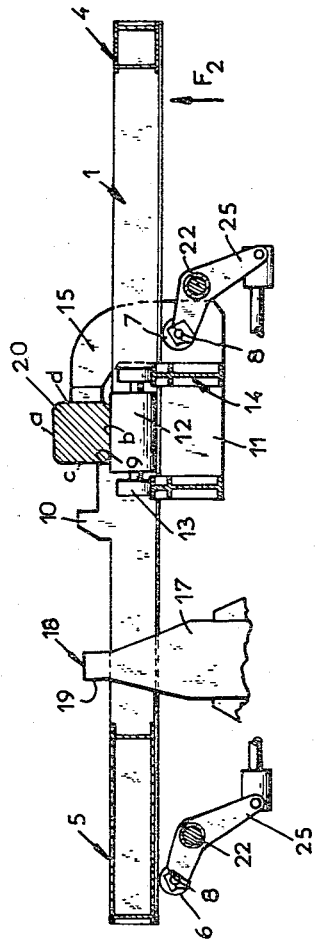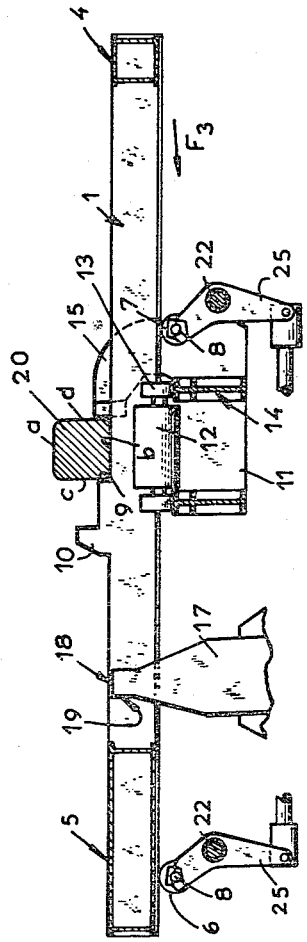

Jan. 14, 1964  J. MROWINSKI  3,117,680
DEVICE FOR HANDLING PIECES HAVING A SQUARE OR LIKE CROSS-SECTION
Filed Aug. 8, 1960  6 Sheets-Sheet 4
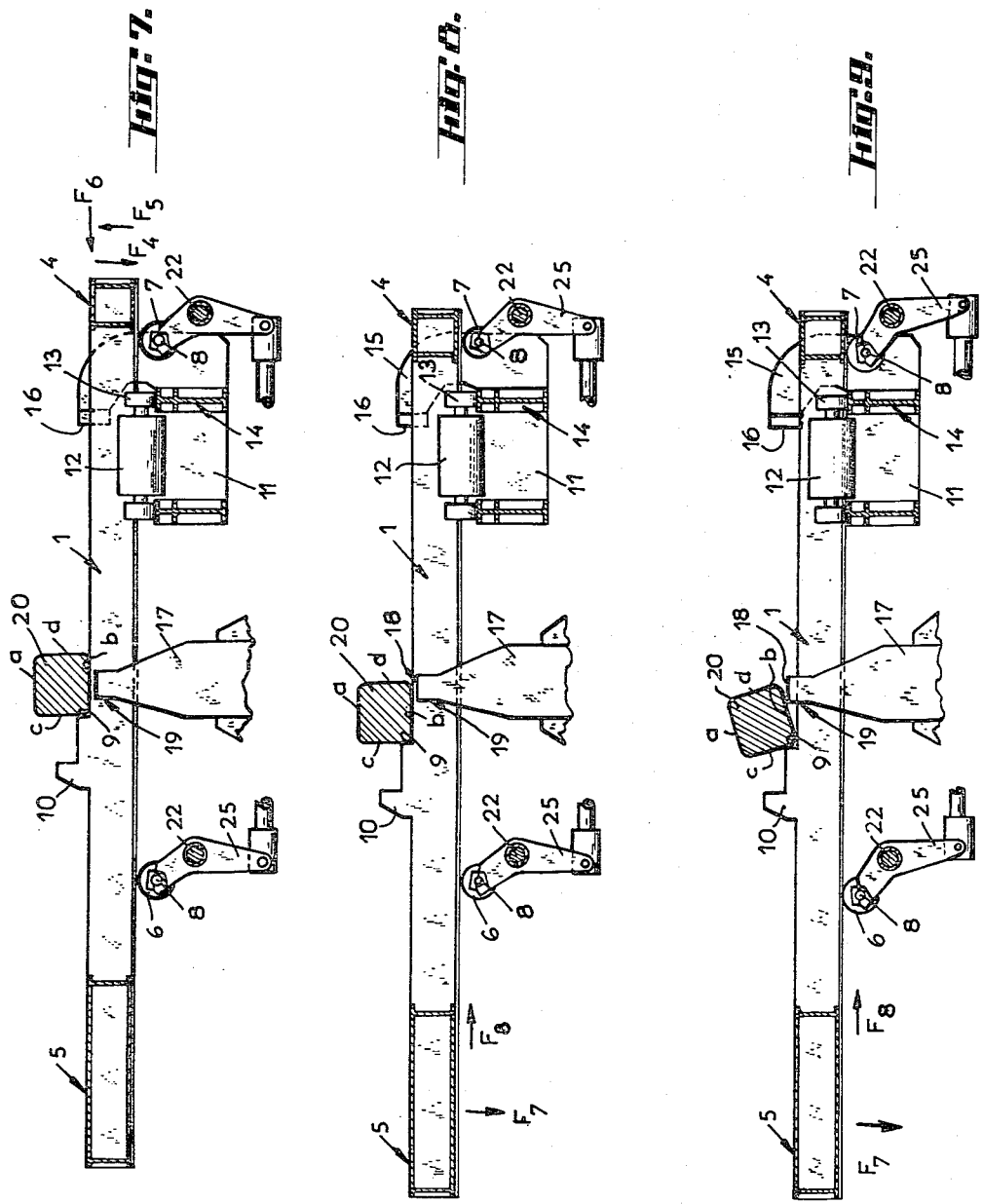
Inventor:
Jerome Mrowinski
BY Nolte & Nolte
Attorneys

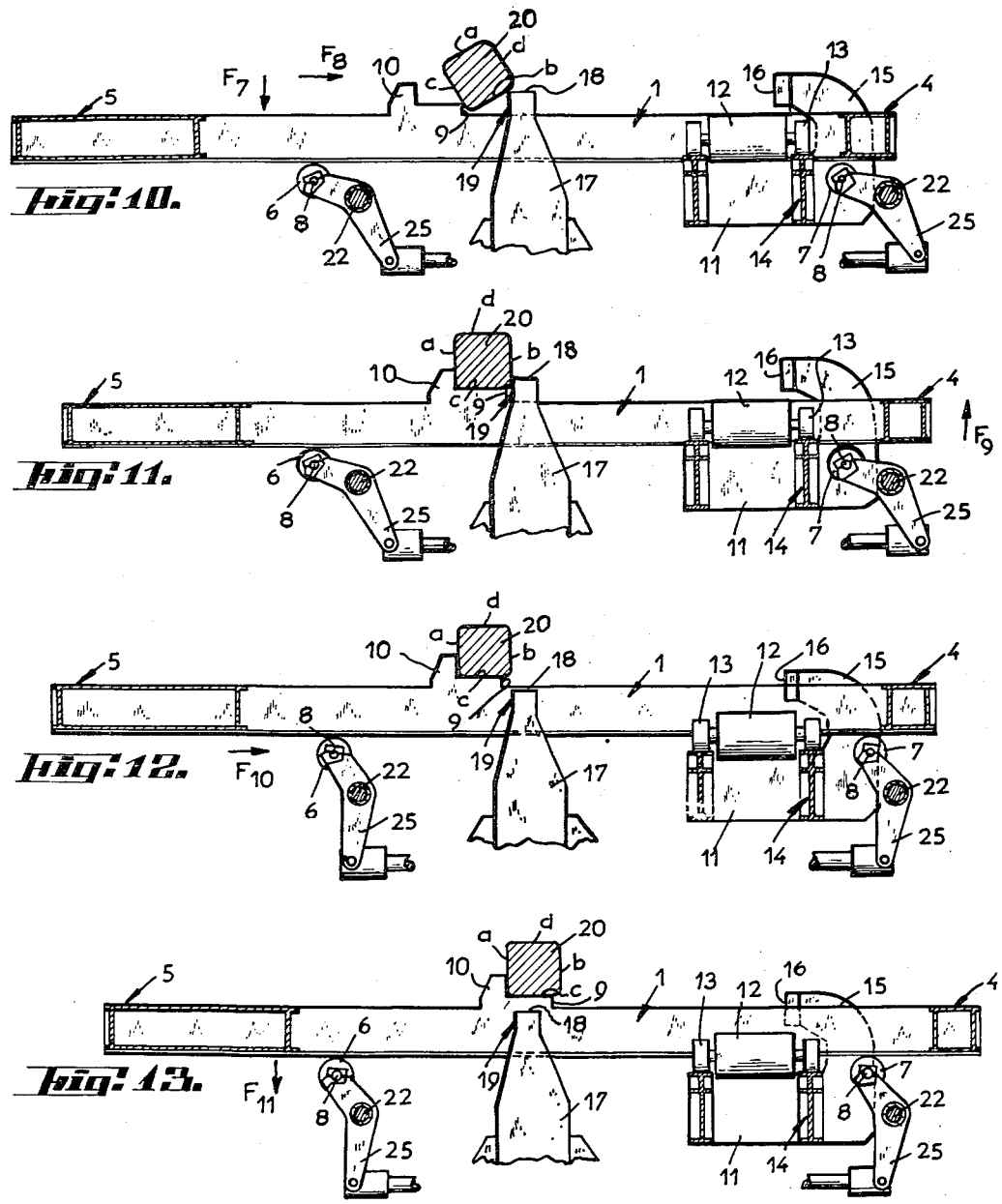

Jan. 14, 1964     J. MROWINSKI     3,117,680
DEVICE FOR HANDLING PIECES HAVING A SQUARE OR LIKE CROSS-SECTION
Filed Aug. 8, 1960     6 Sheets-Sheet 6
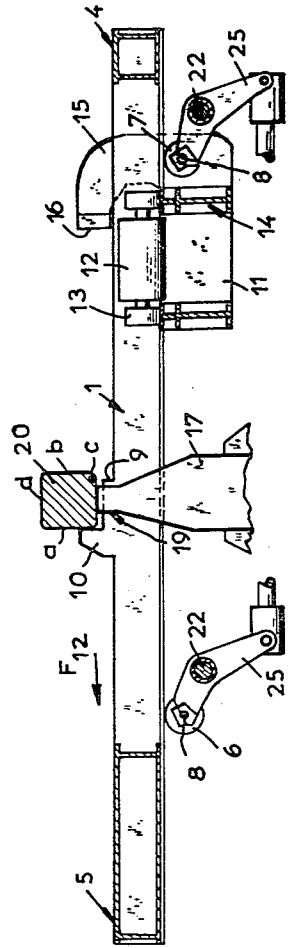
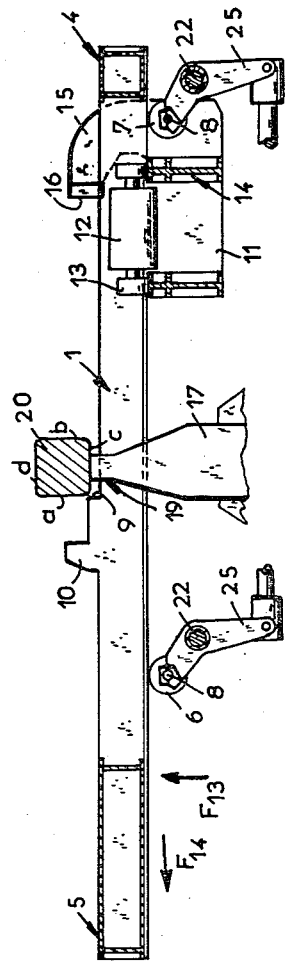
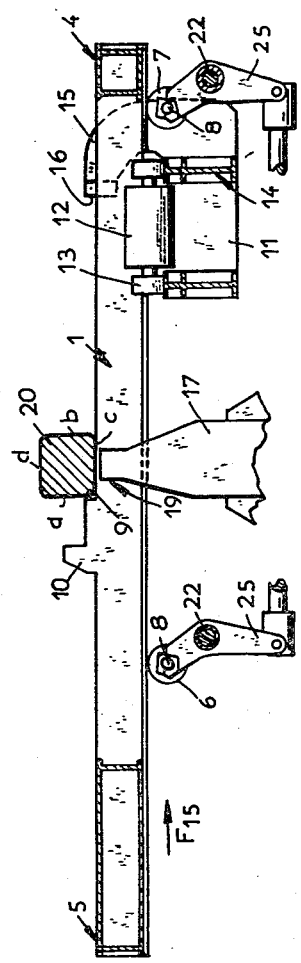
Inventor:
Jerome Mrowinski
BY Molle & Molle
Attorneys United States Patent Office 3,117,680
Patented Jan. 14, 1964

3,117,680
A DEVICE FOR HANDLING PIECES HAVING A SQUARE OR LIKE CROSS-SECTION
Jérôme Mrowinski, Nancy, France, assignor to Societe des Acieries de Pompey, a body corporate
Filed Aug. 8, 1960, Ser. No. 48,179
Claims priority, application France Oct. 14, 1959
7 Claims. (Cl. 214—1)

The present invention relates essentially to piece handling apparatus and has specific reference to a device for handling, turning and positioning pieces having a square, rectangular or generally polygonal cross-section.

It is known that in industry and notably in metallurgy it is frequently necessary to accomplish a well-defined work on the lateral faces of certain relatively heavy pieces or parts. This is notably the case of ingots, blooms, etc. which may require on each of their lateral faces a surface inspection, a repair for flaws, a cleaning step by grinding or flashing, etc. The generally very heavy pieces are directed to or stocked at a well-defined location. The place where the work is performed is sometimes relatively remote from this location, and therefore some means must be provided for transferring the piece from its stocking place to its working place, then properly positioning the piece, permitting the work to be performed, turning the piece—that is, pivoting same so as to cause it to rest on a face adjacent to that on which it had previously rested, re-positioning the piece and permitting again the work to be performed on the new face, and so forth. At the end of these different steps, some means must also be provided for transferring the piece either back to its stocking place or to a conveyor or other discharge means.

For many years various arrangements have been proposed with a view to solve this problem. Now it has become notorious that none of them was capable of permitting a reliable and continuous cycle of operations without any incident.

On the contrary, the device of this invention avoids the various drawbacks usually observed in this connection.

This device is remarkable notably in that its use comprises a first step, or "handling" step, consisting in placing under the piece to be handled a horizontal support provided with stop members and adapted to move both vertically and horizontally, orienting and holding against movement said piece with respect to said support by means of said stop members or other separate stop members independent of said support, causing said support to perform in conjunction with the piece carried thereby an upward movement up to a level slightly higher than that of the feed or stocking device on which the pieces to be handled are carried, bringing said piece through a horizontal movement of translation to a position vertically above the selected working station spaced from but in the direction of the horizontal movements of said support, and positioning said piece with accuracy, by means of adequate stop members, in relation to said working station.

According to another feature of this invention its application in the novel device comprises another phase consisting in pivoting or turning the piece to be handled and cause it to rest on said support through a face adjacent to that through which it rested at the end of the first phase, to this end cause said support to accomplish a slight composite movement consisting of a horizontal movement of translation and a vertical downward movement so as to throw the piece to be handled out of balance by causing this piece to pivot on one edge of a separate stop member independent of said support and rest jointly on one edge of this stop member and on an edge of another stop member carried by said support, stopping the descending movement of said support, imparting thereto a horizontal movement of translation in the opposite direction, that is, toward the first stop member until the piece to be handled which has pivoted through the desired angle is clamped between the aforesaid stop members, imparting to said support and upward movement followed by a horizontal movement of translation and by a descending movement so as to cause the piece thus turned to rest on said separate stop member, and correcting the position of the piece through successive upward movements, horizontal movements of translation and downward movements of the support alone and with said piece.

According to another feature of this invention, the piece to be worked upon is removed from the working station by imparting a rectilinear movement of translation to said support which is followed by a descending movement when this support is located above the feed or stocking device.

From the foregoing it will be readily understood that with the device of this invention it is possible, through a sequence of properly determined operative steps and by using particularly simple means, to handle pieces in a safe manner. As a matter of fact, each time the piece is about to perform a movement, it is firstly clamped between two stop members, this obviously constituting the safest way of properly re-positioning it. Then, the piece is tilted again while guiding it during this step, still by means of these stop members. Moreover, another actuation of these stop members will correct, if need be, the position subsequently occupied by the piece upon completion of this tilting movement.

The device preferably comprises a few stop members and one support, the latter being simply caused to perform a movement of translation and an upward and downward movement. Of course, these two movements may be combined together as set forth in the above preamble.

As outlined hereinabove, the inventive device is remarkable notably in that it comprises a horizontally and vertically movable support adapted on the one hand to be inserted under the piece to be handled carried by its feed or stocking device, and on the other hand to transfer this piece to another remote location, said support comprising stop means and co-acting with other fixed or movable independent stop means with a view to properly position said piece at the desired transfer location, for example substantially above to a working station or the like.

According to another feature of this invention, the aforesaid support consists of an elongated hollow frame.

According to a further feature characterizing this invention, one or more vertical stop members are located in the hollow portion, and/or on either side of the support.

According to a complementary feature of this invention, the aforesaid vertical stop members comprise an upper horizontal portion disposed at such a level that the frame, during its vertical movements, may deposit thereon or take therefrom the piece to be handled, and subsequently retract itself.

According to another feature of this invention, the frame is provided on its upper portion with at least two stop members of different heights.

With the foregoing and other objects in view, the invention resides in the novel arrangement and combination of parts and in the details of construction hereinafter described and claimed, it being understood that changes in the precise embodiment of the invention herein disclosed may be made within the scope of what is claimed without departing from the spirit of the invention.

Other objects and advantages will become apparent from the following description taken in conjunction with the accompanying drawings in which:

FIGURE 1 illustrates diagrammatically in longitudinal section a device constructed according to the teachings of this invention;

FIGURE 1a is a perspective view partially cut-away of the actuating means provided to move vertically the frame of the device;

FIGURE 1b is a perspective view partially cut-away of one of the actuating means provided to move the frame horizontally;

FIGURE 2 is a partial plane view of the device shown in FIGURE 1;

FIGURE 3 is a section taken upon the line III—III of FIGURE 1; and

FIGURES 4 to 16 are very diagrammatic views showing the various essential positions occupied by the frame and the piece to be handled during a cycle of operation.

In the form of embodiment exemplified in FIGURES 1 to 3 of the drawings the device comprises a main support or structure in the form of an elongated frame 1 consisting of a pair of parallel longitudinal members 2, 3 interconnected by two cross members 4, 5. This frame consists essentially of a hollow beam and it will be readily understood that the thickness or dimensions of the two cross-members 4, 5 are immaterial provided that the frame has a free and sufficiently long central cavity.

This frame is supported by rollers 6, 7 of which the number may of course vary as a function of the dimensions and proportions of the longitudinal members 2, 3.

On the upper portion of the frame and on each of its longitudinal members there are provided two stop members 9, 10 of different heights which form together a step bound by substantially vertical faces nearly perpendicular to the longitudinal axis of the frame. The length of the step formed between the two stop members is preferably consistent with the dimensions of the face of the piece to be handled.

In the example illustrated it is assumed that the pieces to be handled have a rectangular cross section and are fed on a train of rollers 11 of which the different rollers and guides are designated by the reference numerals 12 and 13. These rollers are mounted on a support 14.

This train of rollers constitutes a power roller track or conveyor of which the carrier surface lies in a plane slightly above the plane in which the top of the movable frame is displaceable. As shown in FIGURE 3, the two longitudinal members 3, 4 may engage the intervals provided between the pairs of adjacent rollers 12—12′ and 12—12″.

Beyond the roller track or conveyor 11 two or more fixed or detachable stop members 15 each formed with a vertical face 16 are provided.

In the hollow central portion of the frame 1 a stop member 17 having a substantially horizontal top face 18 is placed. The lateral face 19 of this stop member is substantially vertical and nearly perpendicular to the longitudinal axis of the frame 1.

To move the frame 1 in vertical and horizontal direction have been provided the conventional means described hereinafter.

The vertical movements of the frame 1 are obtained by means of a very simple device as shown on FIGS. 1 and 1a. The rollers 6, 7 are mounted on pins 8 supported in turn by arms 21 solid with shafts 22 journalled on vertical supports 23—24. The shafts 22 are pivoted by arms 25 the extremities of which are linked together by a rod 26 which is in turn connected to the piston rod 27 of an actuator 28. The extremity of the cylinder of the actuator 28 opposite to the piston rod 27 is hingedly connected by a pin 29 to a yoke integral with a beam 30 forming a cross-member between the vertical members 23 and 24. A stop 31 is provided under the ends of each lateral arm 21 on which may rest said arm when the frame is in its downward position.

The frame 1 is moved horizontally under the action of two substantially horizontal chains 32 connected to the cross members 4 and 5 respectively as shown on FIG. 1. The control means for both chains are substantially the same as shown diagrammatically in perspective view and partially cut-away on FIG. 1b. According to FIGS. 1 and 1b, the chains are passing over two ratchet wheels 33 and 34 respectively rotating about axes 35 and 36. The axis 35 of the wheel 33 is journalled on a support (not shown) solid with the base 56 of the device whereas the axis 36 of the wheel 34 is rotatable in a structure 37 slidably mounted between two vertical supports 38 secured on two lateral plates 39 integral with the base 56 (plates 38 are not shown on FIG. 1b).

The end of the chain 32 is secured on a horizontal block 40 solid with the base 56, by means of a threaded rod 41 providing the possibility of setting at a correct value the length or the tension of the chain. The horizontal motion of frame 1 is obtained from the left to the right on FIG. 1 by operating an actuator 42 the piston rod 43 of which, integral with the structure 37 pushes upwards the ratchet wheel 34. The magnitude of the horizontal displacement of the frame 1 is of course twice the magnitude of the vertical displacement of the ratchet-wheel 34. Naturally when an actuating fluid is introduced into the actuator 42 the actuator 44 is evacuated (the reverse movements from right to left, being obtained by the operation of actuator 44 and the evacuation of actuator 42).

The operation of the device described hereinabove is particularly simple. Referring to FIGURE 4, it will be seen that the frame is so positioned that its upper plane is substantially level with the upper plane of the roller conveyor 11. The pieces 20 to be handled are fed by means of this conveyor. The selected piece to be handled is firstly positioned and to this end the frame 1 is moved in the direction of the arrow $F_1$ from the position shown in FIGURE 4 to that shown in FIGURE 5. Then, the stop member 9 coacting with stop members 15 clamp the piece 20 therebetween so that the axis of the ingot or like piece 20 may be oriented exactly as desired.

Subsequently, the frame 1 is moved vertically in the direction of the arrow $F_2$ from the position of FIGURE 5 to the position of FIGURE 6. The amplitude of this movement is such that the plane containing the upper faces of the longitudinal members 2, 3 of frame 1 is higher than the level of the top face 18 of stop member 17. Thus, the piece 20 supported by the longitudinal members 2 and 3 is carried completely by the frame which transfers same in the direction of the arrow $F_3$ to the position shown in FIGURE 7. Under these conditions the piece 20 will be located normally to or above the stop 17 or in any other desired location properly determined as a function of the position of the working or treatment station. The adjustment of the vertical position of the piece may be effected, if desired, by moving the frame in the direction of the arrows $F_4$ and $F_5$.

Since, from the very beginning of the operation, the combined action of stop members 9 and 15 has made it possible to adjust the position of the piece 20 in relation to the longitudinal members 2 and 3 by properly seating this piece therebetween, and that, thereafter, the piece was held against lateral movement, and furthermore that the frame may be stopped at a predetermined location in relation to the top face 18 of stop 17, it will be readily understood that the position occupied by this piece 20 in relation to the working station is perfectly accurate.

Thus, the piece 20 is ready for the machining, checking, repair or other treatment step contemplated. During this working period, the frame supporting the piece remains stationary.

The work is performed on the face $a$ of piece 20 resting on the frame 1 through its face $b$.

Upon completion of the work to be performed on the upper face $a$ of piece 20, the latter must be pivoted so as to cause it to rest on its adjacent face $c$ with a view to work on the face $d$. To this end, the frame 1 is firstly moved in the direction of the arrow $F_6$ to the position shown in FIGURE 8, that is, a position in which the piece is shifted in relation to the vertical stop 17 so as to be somewhat overhanging.

Immediately as this position is reached the frame 1 begins to descend while effecting a slight movement of translation in the opposite direction, that is, in the direction of the arrows $F_7$, $F_8$ toward the stop member 17, so that the piece 20 is successively moved to the positions shown in FIGURES 9 and 10. In this last figure it can be seen that the piece 20 is simply carried by the stop members 9 and 17 or more exactly by their edges. It will be readily understood that the function of stop member 17 may be performed by another fixed or detachable stop member, but in any case independent of the frame 1.

At a certain moment the piece 20 is placed with its face $c$ on the step formed between the stop members 9 and 10 and is clamped between the stop 10 and the face 19 of stop 17. This position is shown in FIGURE 11. The movement impressed to the frame in the direction of the stop member 17 is stopped and the frame is subsequently lifted (see arrow $F_9$) to bring it to the position shown in FIGURE 12. In this position the face $c$ of piece 20 is nearly level with the top face 18 of stop member 17. Under these conditions it is sufficient to impart a movement of translation to the frame 1 in the direction of the arrow $F_{10}$ so as to bring it to the desired predetermined position on stop member 17, or simply just above this stop member, as shown in FIGURE 13.

It will be noted that, due to a particularly accurate positioning of the vertical faces of stop members 10 and 17, the position occupied by the piece 20 is determined in all cases with all the desired precision. In fact, due to the thrust exerted by the stop member 10 rigid with the frame, the piece is urged against the surface 19, so that its position is corrected in a completely automatic manner.

When the horizontal thrust has ceased, the frame 1 is lowered (see arrow $F_{11}$) below the level of the top face 18. Thus, the position illustrated in FIGURE 14 is obtained wherein the piece 20 rests upon the face 18 of stop member 17. Then the frame 1 is moved horizontally (see arrow $F_{12}$) so as to bring same to the position previously occupied in relation to the piece 20 when the face $a$ thereof was being worked upon.

The frame 1 is again raised (see arrow $F_{13}$) to enable it to take the piece 20 again (FIGURE 15) whereafter the assembly is caused to travel in the direction of the arrow $F_{14}$ to restore the piece exactly to the position previously occupied by it during the aforesaid working step.

Of course, the same sequence of steps is accomplished for working on other faces of the ingot or like piece to be treated.

When the work is completed, that is, when all the faces of the piece 20 have been treated, worked upon or machined in accordance with the predetermined plan, the frame 1 is simply moved in the direction of the arrow $F_{15}$ of FIGURE 16 and then brought to the feed device 11; when the piece 20 overlies this device 11 the frame 1 is lowered so that the piece is returned to the discharge device.

From the foregoing it will be readily understood that all these steps may take place in a very simple manner, that the means necessary therefor are also very simple, and that the complete sequence of steps may be carried out by simply conjugating in a manner known per se the upward and downward movements of the rollers with the rectilinear movements of the frame 1. Besides, the same result may be obtained by controlling all these movements separately by means of a manual control arrangement.

As shown, the device described herein applies not only to square or rectangular-sectioned pieces but also to any pieces having a polygonal cross-section. It is simply sufficient to adapt the faces of stop members 15, 9, 10 and 19 to the angular relationship existing between the faces of the piece 20. In this respect it may be pointed out that adequate bosses or like elements may be substituted for the stop members 15, 9, 10 and 19.

Of course, the invention should not be construed as being limited to the form of embodiment shown and described herein, as many modifications and alternations may be brought thereto without departing from the scope of the invention as set forth in the appended claims.

What I claim is:

1. A device for handling, overturning and positioning bodies of polygonal cross-section, comprising a horizontal elongated hollow frame-like structure, first actuating means to impart horizontal translatory movement to said structure, second actuating means to impart vertical movement to said structure, a first stop member solid with said structure on the upper face thereof, a second stop member independent from said structure and extending therethrough, and means to set said bodies on said structure at a given end thereof and to carry them away therefrom.

2. A handling device according to claim 1, wherein said second stop member is provided with a horizontal flat top surface.

3. A handling device according to claim 2, wherein said second stop member is provided at its upper portion with a vertical flat lateral face perpendicular to said translatory movement and facing the end opposite to said given end of said structure.

4. A handling device according to claim 3, wherein said first stop member includes a step bound by two vertical faces.

5. A handling device according to claim 4, wherein said structure includes two longitudinal members connected at their ends by two transverse beams, said first stop member including two stop member elements each located on one of said members.

6. A handling device according to claim 1, wherein said setting and carrying means includes roller track means having a supporting surface for said bodies at a level so that said structure is allowed to travel therebeneath.

7. In an installation comprising a feeding and stocking device having roller track means and a working location distant therefrom, a device for handling, overturning and positioning a body of polygonal cross-section delivered by said track means to said device, the latter comprising a movable horizontal elongated hollow frame-like structure mounted to travel beneath the upper level of said track means, first actuating means to impart horizontal translation to said structure, second actuating means to impart vertical movement to said structure, a first stop member solid with said structure on the upper face thereof, and a second stop member independent from said structure and extending therethrough.

References Cited in the file of this patent

UNITED STATES PATENTS

| 721,626 | Wellman | Feb. 24, 1903 |
| 2,238,434 | Oberhoffken | Apr. 15, 1941 |
| 2,621,805 | Young | Dec. 16, 1952 |
| 2,819,563 | Lowe | Jan. 14, 1958 |

FOREIGN PATENTS

| 1,009,145 | Germany | May 29, 1957 |